No. 842,945. PATENTED FEB. 5, 1907.
F. A. DECKER.
BATTERY ELEMENT.
APPLICATION FILED FEB. 1, 1906.

WITNESSES:—
Louis H. Buck.
[signature]

INVENTOR:—
Frank A. Decker
BY
Charles N. Butler
ATTORNEY.

UNITED STATES PATENT OFFICE.

FRANK A. DECKER, OF PHILADELPHIA, PENNSYLVANIA, ASSIGNOR, BY MESNE ASSIGNMENTS, TO DECKER ELECTRICAL MANUFACTURING COMPANY, OF WILMINGTON, DELAWARE.

BATTERY ELEMENT.

No. 842,945.

Specification of Letters Patent.

Patented Feb. 5, 1907.

Application filed February 1, 1906. Serial No. 298,960.

*To all whom it may concern:*

Be it known that I, FRANK A. DECKER, a citizen of the United States, and a resident of Philadelphia, in the county of Philadelphia and State of Pennsylvania, have invented certain Improvements in Battery Elements, of which the following is a specification.

This invention is a battery plate or element having an extended surface within a limited space and a comparatively thin body reinforced to secure the strength requisite therefor, improved means being provided for connecting it with the parts of the cell in which it is used.

In the preferred element carbon is brought to a form, preferably by molding and baking or graphitizing, having a corrugated or indented body with borders and transverse ribs reinforcing it, the top of the plate being enlarged either by flanging or gradually thickening and having means for engaging a binding-screw securely therein.

Figure 2:
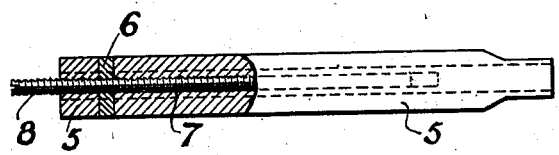
Figure 4:
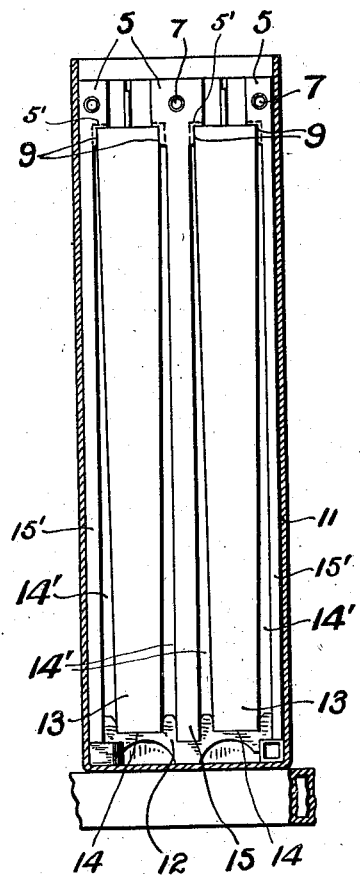
Figure 1:
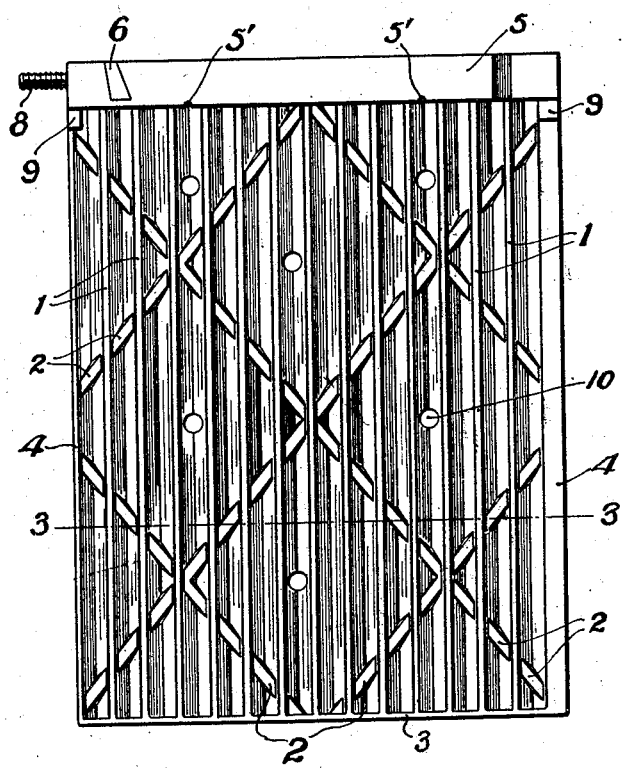
Figure 3:

In the accompanying drawings, Figure 1 represents a face view of a plate made in accordance with my invention. Fig. 2 represents a top view thereof with a part shown in section. Fig. 3 represents a sectional view taken on the line 3 3 of Fig. 1. Fig. 4 represents an end view of the plates or electrodes in the positions they occupy in the cell, the wall of which has been broken away; and Fig. 5 is a perspective view of a section of the top of a plate having a modified construction.

As shown in Figs. 1 to 4, inclusive, of the drawings, the invention is a carbon-plate having the body corrugations 1 crossed by the intersecting reinforcing ribs or stays 2, with the bottom border 3, the side borders 4, and the top flange or flanges 5 thereon, gasvents 5' being provided in the lower parts of the flanges. Set across the flanged top of the plate is a holding device 6, preferably of metal, with a thread therein to form a nut, cast or otherwise, inserted in the seat provided therefor in the top of the plate. A threaded hole 7, disposed lengthwise in the top of the plate and extending through the nut 6 and the greater part of the width of the plate, receives a long binding-screw 8, which is thus provided with an effective electrical and firm mechanical connection with the electrode. Lugs 9 on the plate provide spacing means, and holes 10 through the plate-body provide for circulation therethrough.

Figure 5:
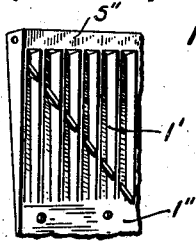

As shown in Fig. 5, the plate may be tapered from the top downwardly, with the corrugations or depressions 1' growing shallower from enlargement 5" and preferably disappearing in the plain lower portion 1". There is thus provided a peculiar wedge-shaped construction in which the cross-sectional area increases from the bottom to the top or terminal connection, providing an increasing current-carrying capacity varying with the current accumulation at the several elevations.

In the assembled construction shown in Fig. 4 the cell envelop 11 has the bridge 12 supported on the bottom thereof with the bottoms of the cups or compartments 13 resting in the seats 15, the cups being tapered in cross-section from the top to the bottom and dividing the cell into compartments 14', tapering from the bottom to the top. In the compartments 14' are the carbon plates 15 15', respectively supported by their flanges or enlargements 5, resting on the tops of the cups and covering the compartments exterior thereto. The vents 5' in the flanges permit the escape of gas from the compartments otherwise covered. The lugs 9 on the plates bear against the faces of the cups, while the plate-bottoms engage the bridge 12, by which the plates are held.

Having described my invention, I claim—

1. A molded and baked carbon primary battery-plate having a corrugated body provided with edge and interior bracing members the interior bracing members being diagonally disposed to the corrugations.

2. A molded and baked carbon battery-plate having a perforated body with corrugated surfaces and bracing members diagonally disposed with reference to said corrugations.

3. A battery-plate of molded and baked carbon having a nut embedded therein, a hole in said element passing through said nut, and a metal screw in said hole engaging said nut and element.

4. A negative battery-plate comprising a thin body having an enlarged top with a long, horizontally-disposed hole extending therein parallel to said body, and a long metal conductor disposed in said hole.

5. A molded and baked carbon battery-plate having a screw-threaded hole therein and extending along an edge thereof, in combination with a screw-threaded conducting-rod of metal adapted to fit in said hole.

6. A carbon battery-plate having a corrugated body whose cross-sectional area increases between its bottom and top, in combination with a metal rod disposed horizontally in said top.

In testimony whereof I have hereunto set my hand, this 31st day of January, 1906, in the presence of the subscribing witnesses.

FRANK A. DECKER.

Witnesses:
ROBERT JAMES EARLEY,
HENRY S. GOLDEY.